April 24, 1951      E. PETRAKAKIS      2,550,594
FLUTED SHIELD FOR HEADLIGHTS
Filed Dec. 31, 1947
FIG.1
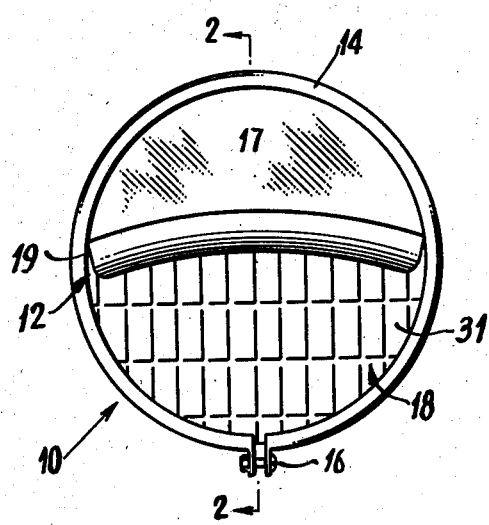
FIG.2
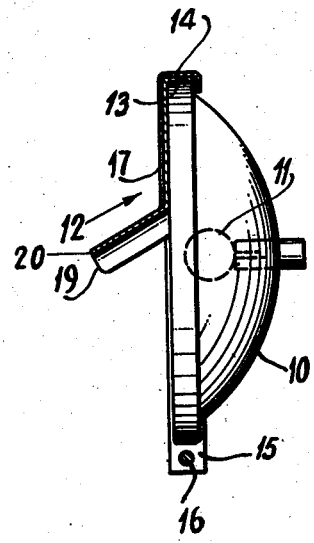
FIG.3
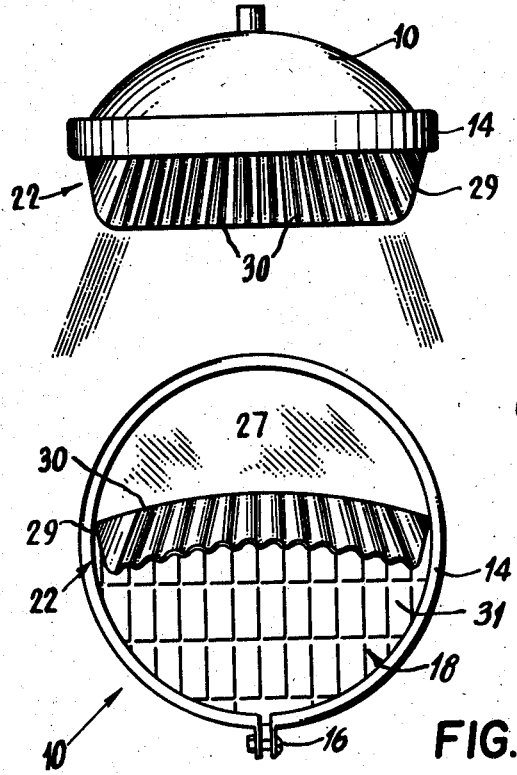
FIG.4
FIG.5
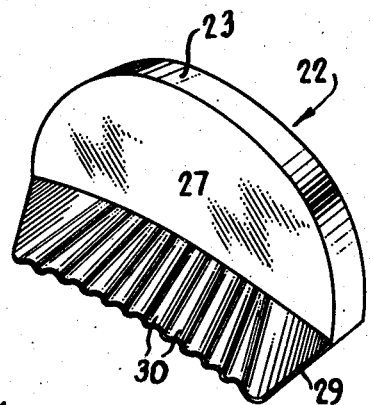
EMANUEL PETRAKAKIS
INVENTOR
BY *Albert Levine*
ATTORNEY Patented Apr. 24, 1951

2,550,594

UNITED STATES PATENT OFFICE 2,550,594

FLUTED SHIELD FOR HEADLIGHTS

Emanuel Petrakakis, New York, N. Y.

Application December 31, 1947, Serial No. 794,860

2 Claims. (Cl. 240—46.53)

This invention relates to automobile headlights and particularly to an attachable headlight shield so constructed and arranged that it will eliminate the glare or direct light from the headlights toward on-coming drivers while at the same time projecting ample and strong light on the road in front of the automobile for a substantial distance ahead.

An object of this invention is to provide in a manner hereinafter set forth, a headlight shield in the form of an attachment for the purpose referred to, which may be constructed of sheet metal by a single stamping operation so as to materially reduce the cost of production and which is simple in its construction, strong, durable, thoroughly efficient in its use and inexpensive to manufacture.

Another object of this invention is to provide a headlight shield which is provided with a reflecting lower surface, this being preferably obtained by chromium plating the surface.

Another object of this invention is to provide a glare preventing attachment shield which can be attached to any standard automobile headlight and which will not only prevent the upwardly directed rays from reaching the eyes of oncoming drivers but will cause the rays to be directed forwardly and downwardly thereby increasing the lighting of the road ahead of the vehicle.

Another object of this invention is to form ribs of semi-circular cross-section in the reflecting surface of the shield so as to cause beams of light to be reflected and thrown downwardly by the headlight, while harmful glare is obviated.

Another object of this invention is to converge the ribs toward the light bulb so that the reflected beams of light will diverge and increase the lighted area of the roadway in advance of the automobile to assure a clear vision of the roadway.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a front elevation of a headlight equipped with the glare shield.

Figure 2 is a cross-sectional view taken on line 2—2 in Figure 1.

Figure 3 is a top plan view of the headlight shown in Figures 1 and 2, and having a modified glare shield attached thereto.

Figure 4 is a front elevation of the headlight and glare shield shown in Figure 3.

Figure 5 is a perspective view of the modified glare shield shown in Figures 3 and 4.

In the illustrated embodiment of the invention shown in Figures 1 and 2, the numeral 10 indicates an automobile headlight having an incandescent light bulb 11 and equipped with a headlight glare shield 12 made in accordance with this invention. The shield 12 is preferably made of metal.

The glare shield comprises an arcuate flange 13 which fits within a clamping member 14 of annular formation. The clamping member 14 is provided at its lower end with lips 15 which are apertured to receive a clamping screw 16 in order to secure the clamping member 14 to the headlight 10.

The glare shield 12 comprises a substantially semi-circular opaque and non-reflecting section 17 which is in contacting relation with the upper portion of the headlight lens 18. The shield section 17 serves to exclude light from the upper portion of the lens.

The shield 12 also comprises a concave section 19 having a lower reflecting surface. The section 19 extends downwardly and forwardly from the opaque lens-contacting section 17. The lowest central portion 20 of the section 19 is in alinement with the axis of the bulb 11. The reflecting section 19 directs light from the light bulb downwardly and forwardly of the headlight 10.

Figures 3 to 5 inclusive show a modified headlight shield 22 made to fit the headlight 10. The shield 22 comprises an arcuate flange 23 which fits within the clamping member 14.

The shield 22 comprises a substantially semi-circular opaque section 27 which is positioned in contacting relation with the upper portion of the headlight lens 18. The shield section 27 excludes light from the upper section of the lens 18, the same as the section 17 shown in Figures 1 and 2.

The shield 22 comprises a concave section 29 having a lower reflecting surface. The section 29 extends downwardly and forwardly from the opaque lens-contacting section 27. The section 29 is improved with semi-circular ribs 30 all over its surface. The ribs are directed toward the axis of the light bulb 11. Each rib 30 is of diverging form and smaller at the lens than at the free end portion of the section 29. It is to be noted that small portions at each end of the section 29 may be without ribs as shown.

It is to be noted that the walls of the ribs 30 taper outwardly and that the axes of the ribs diverge. Also that the reflecting section 29 is positioned in obtuse angular relation with the upright non-reflecting section 27.

As shown in Figures 1 and 4, the lens 18 has vertical flutes 31. The ribs 30 in the reflecting section 29 are in alinement with the flutes 31 and coact therewith in directing the beams of light. In the preferred embodiment, there is an equal number of ribs 30 and flutes 31.

It will thus be seen that a more efficient light is produced with the ribbed shield than is the case with a shield having a single continuous reflecting surface, the reflecting ribs radiating outwardly and forwardly causing the light to be projected from the lower part of the headlight with downwardly directed beams of light and consequent safety to approaching automobiles and also to pedestrians.

In accordance with the patent statutes I have described and illustrated the preferred embodiments of my invention, but it will be understood that various changes and modifications can be made therein without departing from the spirit of the invention as defined by the appended claims.

I claim:

1. The combination, with a headlight having a lens provided with a plurality of vertical flutes, of an arcuate reflecting strip attached to said lens so as to extend downwardly and away therefrom while having one edge in contact with the lens, said strip being provided with a plurality of ribs equal in number to and substantially aligned with said flutes and extending approximately transversely to said edge across the full width of said strip.

2. The combination according to claim 1 wherein said ribs diverge from said edge toward the opposite side of said strip.

EMANUEL PETRAKAKIS.

REFERENCES CITED

The following references are of record in the file of this patent:

UNITED STATES PATENTS

| Number | Name | Date |
|---|---|---|
| 1,440,292 | Hartmann | Dec. 26, 1922 |
| 1,474,714 | Hartmann | Nov. 20, 1923 |
| 1,485,777 | Hartmann | Mar. 4, 1934 |
| 1,593,402 | Halvorson, Jr. | July 20, 1926 |
| 1,600,682 | McCarley | Sept. 21, 1926 |
| 1,615,336 | Middleton | Jan. 25, 1927 |

FOREIGN PATENTS

| Number | Country | Date |
|---|---|---|
| 246,311 | England | Jan. 28, 1926 |